United States Patent [19]

Deardorff et al.

[11] 4,297,303

[45] Oct. 27, 1981

[54] PREPARATION AND REACTION OF ENERGY PRODUCING WASTE MATERIAL COMPOSITION

[76] Inventors: Paul A. Deardorff, 1128 Dix, Lincoln Park, Mich. 48146; Robert C. Wood, 36002 Huron River Dr., New Boston, Mich. 48164; Sante M. Cundari, 530 Woodcrest, Dearborn, Mich. 48124

[21] Appl. No.: 111,724

[22] Filed: Jan. 14, 1980

Related U.S. Application Data

[62] Division of Ser. No. 901,492, May 1, 1978, Pat. No. 4,208,226.

[51] Int. Cl.$^3$ .............................................. C06B 21/00
[52] U.S. Cl. ..................................... 264/3 R; 149/37; 149/109.6
[58] Field of Search ..................... 149/37, 44, 109.6; 264/3 R

[56] References Cited

U.S. PATENT DOCUMENTS

| 1,430,667 | 10/1922 | Merrefield | 149/37 |
| 1,751,550 | 3/1930 | Hyde | 149/37 |
| 2,276,671 | 3/1942 | Renotschler et al. | 149/37 |
| 3,160,537 | 12/1964 | Trafton, Jr. | 149/37 |
| 3,347,721 | 10/1967 | Jago | 149/37 |
| 3,745,077 | 7/1973 | Jones | 149/40 |
| 4,055,881 | 11/1977 | La Bate | 149/37 |
| 4,114,591 | 9/1978 | Nakagawa | 149/37 |
| 4,208,226 | 6/1980 | Deardorff et al. | 147/37 |
| 4,216,041 | 8/1980 | Deardorff et al. | 149/37 |

FOREIGN PATENT DOCUMENTS

| 1467737 | 10/1969 | Fed. Rep. of Germany | 149/37 |
| 579741 | 9/1942 | United Kingdom | 149/37 |

Primary Examiner—Edward A. Miller
Attorney, Agent, or Firm—Gifford, VanOphem, Sheridan & Sprinkle,

[57] ABSTRACT

Waste materials from the conversion of iron ore to pig iron or steel combine with a reducing metal, such as aluminum or magnesium, and a small portion of a mineral acid to form a reaction mixture which gives a heat output superior to many conventional fuels. The materials are processed in several steps to produce either a shaped or loose composition, a portion of which is then heated to a reaction temperature. Retardants for the reaction may be added.

16 Claims, No Drawings

PREPARATION AND REACTION OF ENERGY PRODUCING WASTE MATERIAL COMPOSITION

CROSS REFERENCE TO RELATED APPLICATIONS

This is a division of application Ser. No. 901,492, filed May 1, 1978, now U.S. Pat. NO. 4,208,226.

BACKGROUND OF THE INVENTION

I. Field of the Invention

The present invention relates generally to fuels for heat production, such fuels being comprised primarily of the waste materials remaining after steel or pig iron production from iron ore.

II. Description of the Prior Art

Many thermit materials are well known for use as external heat producers for welding, for incendiary compositions, etcetera. Burch, in U.S. Pat. No. 2,402,947 describes a Flux Forming Fuel and Process. Jones, in U.S. Pat. No. 3,745,077 describes a Thermit Composition for use as an incendiary. Thermit materials have also been used as a retardant in conjunction with higher temperature reactants. Cox, in U.S. Pat. No. 3,181,937 teaches a device which employs this technique.

The term "thermit" generally refers to a mixture of iron oxides and aluminum which, when heated, reacts at temperatures of about 5000° F. The term "thermit" is also used to refer to a combination of any of several reducing metals with iron oxides. The reducing metal may be aluminum, magnesium, and the like. The following reactions are typical:

| | |
|---|---|
| $8Al + 3Fe_3O_4$ | $9Fe + 4Al_2O_3$ |
| $2Mg + Fe_2O_3$ | $2Fe + Mg_2O_3$. |

Many variations of this type reaction are known in the art. For example, Rejdak, in U.S. Pat. No. 3,020,610 teaches a variation of the method which is particularly useful for welding aluminum to aluminum. Also, see Rejdak's U.S. Pat. No. 3,033,672 which describes a method for welding copper to steel.

The reactions are exothermic and can react at temperatures in excess of about 6000° F. Interestingly, none of the methods to date have used either the method or the easily obtained materials of Applicant's invention. Heretofore, these reactions have typically employed chemically pure materials. Most applications direct the reaction heat to a localized area or specified material as in the case of welding or incendiary applications. Cost and availability of these relatively expensive materials have to data precluded use of such materials for commerical fuel requirements.

It is therefore an object of the present invention to overcome the cost and availability restrictions of conventional fuels and previously known thermit materials.

SUMMARY OF THE INVENTION

We have found that the foregoing and related objects can be attained by forming a composition wherein the primary ingredient is an iron-containing waste by-product from steel production or similar processes. These by-products had heretofore been merely disposed of.

Waste materials are combined with a concentrated mineral acid and retardants. Alternately, diluted acid may be used this requiring less water to make the mixture moldable in a later step. Aluminum, magnesium, or another reducing metal is added to enough water to make the mixture pliable. The mixture is then molded and is cured for a short period. Sufficient heating of a small portion induces reaction of the entire sample.

DESCRIPTION OF THE PREFERRED EMBODIMENT

Applicants have devised a method of combining any of several iron-containing by-products with other materials to form a composition in either shaped or loose form to be used for heat production. Tests have shown that the exothermic heat produced by such compositions is so great in some cases that retardants such as sand or lime should be added to control the reaction and extend the reaction time.

Any of several by-products may be used. These include flue dust, mill scale, B.O.P. dust, filter cake, and sinter blends. In addition to the above list of by-products, any dust-like or powdery iron-containing waste product is suitable for the invention. Analysis of the materials was performed and all contain iron oxides. By way of example, the following result was obtained for B.O.P. dust.

| Substance | Approximate % by weight |
|---|---|
| Free metallic iron | 0.4 |
| $Fe_2O_3$ | 49.0 |
| FeO | 20.4 |
| Carbon | 0.7 |
| $H_2O$ (liquid) | 1.0 |
| PbO | 0.7 |
| ZnO | 5.1 |
| CaO | 11.3 |
| MnO | 0.9 |
| $P_2O_5$ | 0.1 |
| $SiO_2$ | 1.7 |
| $Al_2O_3$ | 0.5 |
| MgO | 2.8 |
| Moisture | 1.9 |

B.O.P. dust is a by-product from steel production. Most steel production from iron ore involves two basic phases. The first phase melts iron ore in a blast furnace producing iron, clinkers, and in relatively small amounts several dust-like iron containing waste by-products. These dust-like by-products collect on the iron, in flues, and on other areas. The second phase of the steel production converts the aforementioned iron to steel in an electric furnace. This electric furnace process also produces relatively small amounts of iron-containing waste by-products. The by-products from both phases normally vary from about 30% to about 70% by weight iron.

It is the scheme of the present invention to utilize the aforementioned waste by-products for heat production and various industrial, commercial, or consumer applications such as, for example, production of steam.

Some examples of the composition and method of the invention are given below. It is not intended that the invention be limited to the by-products, compositions, or methods used in these examples.

EXAMPLE 1

Materials:
60 ounces of wet filter cake in a slurry
40 ounces of dry B.O.P. dust
20 ounces of dry filter cake 24 ounces of aluminum powder with the largest dimension of any aluminum particle no larger than about ⅛ inch 7.5 ounces of lime retardant 5 ounces of a solution of 20% by weight hydrochloric acid Method:

The lime retardant is added to the three waste by-products. The acid is added and the composition is mixed well and then allowed to stand for six hours. Enough water is added to make the composition moldable. The aluminum is added. The composition is mixed well, poured into a mold, and pressed at a pressure of about ten pounds per square inch or more. This mold is then allowed to cure by standing for about three hours. While the mixture stands, it is observed that heating occurs to such a temperature that steam is given off and the composition then usually hardens to a dimensionally stable form or brick. A portion of the resulting product is then heated by an electric arc. An initial reaction temperature of greater than 3000° F. is required. The composition burns at a linear rate of about 0.85 inches per minute, reaches a maximum temperature of about 6000° F., and produces heat calculated to be about 200,000 BTU per pound of composite. This can be compared with bituminous coal which yields about 12,000 BTU per pound.

EXAMPLE 2

Materials:

40 ounces of black filter cake slurry 10 ounces of B.O.P. dust 10 ounces of aluminum powder with the largest dimension of any aluminum particle no larger than about ⅛ inch 3 ounces of water 2 ounces of hydrochloric acid solution, 20% by weight Method:

Procedure used was the same as in Example 1. A propane torch of approximately 3400° F. was used to heat a portion of the reaction mixture. Reaction is spontaneous with a linear burn ,ate of about 0.27 inches per minute, a maximum temperature of about 6000° F., and heat production is calculated to be about 200,000 BTU per pound of composite.

EXAMPLE 3

Materials:

40 ounces of dry B.O.P. dust 60 ounces of filter cake slurry 18 ounces of aluminum with the largest dimension of any particle no larger than about ⅛ inch 7 ounces of lime 7 ounces of bituminous coal 7 ounces of hydrochloric acid solution, 20% by weight Method:

Again, the procedure used was the same as that in Example 1 except that bituminous coal was also added. Ignition of a portion of the sample by electric arc in excess of 4000° F. produced a linear burn rate of 1.61 inches per minute, a maximum temperature of about 6000° F., and resulting heat calculated to be about 200,000 BTU per pound.

The aluminum or other reducing metal is preferably smaller than about 1/10 inch in its largest dimension. Any mineral acid is effective in the process either alone or in combination, but hydrochloric acid is preferred.

The burn rate can be controlled by variation of the portions of retardant, waste material, or reducing metal. The materials should fit within the parameters listed below:

| Material | Parameter |
| --- | --- |
| Iron-containing by-products: | at least about 50 to 95% of the composite mixture |
| Reducing metal: | about 12 to about 25% by weight of the iron-containing by-product |
| Retardant: | less than about 40% by weight of iron-containing by-product |
| Acid: | about 2% to about 10% by weight of the iron containing by-product |
| Water: | enough to make the mixture pliable. |

Tests have indicated that these compositions burn well with coal as in Example 3. Aluminum "dross", an impure aluminum waste, has been used in pulverulent form in lieu of commercially purchased metal. This has proven effective for the reaction when used in sufficient quantity and again, lowers the cost of the composition.

Having described our invention it is not intended that the examples in any way limit the scope of the invention as other variations of the composition and method will become apparent to one skilled in the art.

Therefore, we claim:

1. A method for preparing a composition for the production of heat comprising the steps of:
    (a) mixing an iron-containing waste by-product with a desired retardant, said iron-containing waste by-product including an iron oxide,
    (b) letting the composition stand for up to 24 hours,
    (c) mixing well with acid,
    (d) adding any water required to make the substance pliable,
    (e) adding a reducing metal,
    (f) then molding the composition and letting it stand for up to 4 hours.

2. A method as defined in claim 1 wherein the acid is hydrochloric acid.

3. A method as defined in claim 1 wherein the retardant is lime.

4. A method as defined in claim 1 wherein the retardant is sand.

5. A method as defined in claim 1 wherein the retardant is crushed stone.

6. A method as defined in claim 1 wherein the retardant is ashes.

7. A method as defined in claim 1 wherein the reducing metal is aluminum in the amount of about 15% to about 25% by weight and wherein the aluminum is in powdered form such that the largest dimension of any aluminum particle does not exceed about ⅛ inch.

8. A method as defined in claim 1 wherein the iron-containing waste is flue dust.

9. A method as defined in claim 1 wherein the iron-containing waste is mill scale.

10. A method as defined in claim 1 wherein the iron-containing waste is B.O.P. dust.

11. A method as defined in claim 1 wherein the iron-containing waste is filter cake.

12. A method as defined in claim 1 wherein the iron-containing waste is a sinter blend.

13. A method as defined in claim 1 wherein a plurality of iron-containing waste by products are used.

14. A method as defined in claim 1 wherein the said reducing metal is added in the form of an impure waste.

15. A method as defined in claim 1 wherein the reducing metal is impure aluminum dross waste.

16. A method for preparing a composition for the production of heat comprising the steps of:
   (a) mixing an iron-containing waste by-product with a mineral acid, said iron containing waste by-product including an iron oxide,
   (b) adding any water required to make the substance pliable,
   (c) adding a reducing metal,
   (d) then molding the composition and letting it stand.

* * * * *

UNITED STATES PATENT AND TRADEMARK OFFICE
CERTIFICATE OF CORRECTION

PATENT NO. : 4,297,303
DATED : October 27, 1981
INVENTOR(S) : Paul A. Deardorff

It is certified that error appears in the above—identified patent and that said Letters Patent is hereby corrected as shown below:

Column 1, line 54, delete "data" and insert thereinstead --date--
Column 1, line 68, delete "this" and insert thereinstead --thus--
Column 3, line 44, delete ",ate" and insert thereinstead --rate--.

Signed and Sealed this

Twenty-second Day of February 1983

[SEAL]

Attest:

GERALD J. MOSSINGHOFF

*Attesting Officer*  *Commissioner of Patents and Trademarks*